United States Patent [19]

Valpey, III et al.

[11] Patent Number: 5,480,951

[45] Date of Patent: Jan. 2, 1996

[54] CURABLE COMPOSITIONS INCORPORATING ANHYDRIDE-FUNCTIONAL POLYMERS DERIVED FROM ALKENYL SUCCINIC ANHYDRIDE

[75] Inventors: Richard S. Valpey, III, Matteson; Thomas W. Yokoyama, Chicago; John D. Kraan, Hometown, all of Ill.; H. James Harwood, Stow, Ohio

[73] Assignee: The Sherwin-Williams Company, Cleveland, Ohio

[21] Appl. No.: 176,046

[22] Filed: Jan. 3, 1994

[51] Int. Cl.$^6$ .................. C08F 222/04; C08F 224/00; C08F 222/02; C08F 220/10
[52] U.S. Cl. .................. 526/271; 526/328.5; 526/273; 526/318.2
[58] Field of Search .................. 526/271, 273, 526/318.2, 328.5

[56] References Cited

U.S. PATENT DOCUMENTS

| | | | |
|---|---|---|---|
| 2,884,408 | 4/1959 | Phillips et al. | 260/78.3 |
| 3,523,143 | 8/1970 | Kwong | 260/835 |
| 3,975,314 | 8/1976 | Smyk et al. | 260/2 |
| 4,026,867 | 5/1977 | Cardiner | 260/46 |
| 4,107,114 | 8/1978 | Nakayama et al. | 260/22 |
| 4,374,235 | 2/1983 | Culbertson et al. | 526/262 |
| 4,599,432 | 7/1986 | Kuroda et al. | 549/255 |
| 4,703,101 | 10/1987 | Singer et al. | 528/87 |
| 4,720,555 | 1/1988 | Nash | 549/252 |
| 4,859,758 | 8/1989 | Shalati et al. | 527/313 |
| 4,871,806 | 10/1989 | Shalati et al. | 525/108 |
| 4,927,868 | 5/1990 | Schimmel et al. | 523/439 |
| 4,946,744 | 8/1990 | Shalati et al. | 428/500 |
| 5,066,742 | 11/1991 | Gupta | 526/216 |
| 5,093,391 | 3/1992 | Barsotti et al. | 523/400 |
| 5,206,295 | 4/1993 | Harper et al. | 525/207 |
| 5,227,243 | 7/1993 | Shalati et al. | 428/457 |

FOREIGN PATENT DOCUMENTS

| | | |
|---|---|---|
| 0979020 | 12/1975 | Canada. |
| 46-27530 | 8/1971 | Japan. |
| 48-43191 | 12/1973 | Japan. |
| 1225964 | 9/1989 | Japan. |

*Primary Examiner*—Joseph L. Schofer
*Assistant Examiner*—Wu C. Cheng
*Attorney, Agent, or Firm*—Robert E. McDonald; Steven W. Tan; Heidi A. Boehlefeld

[57] ABSTRACT

A curable composition which comprises:

(a) an anhydride-functional polymer obtained by polymerizing under free radical addition polymerization conditions, a monomer mixture comprising:

(i) 20 to 75 weight percent of an alkenyl succinic anhydride having the structure:

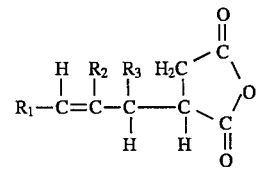

wherein $R_1$, $R_2$ and $R_3$ are each independently hydrogen or alkyl or substituted alkyl of 1 to about 30 carbons; and (ii) 25 to 80 weight percent of at least one (meth)acrylic monomer copolymerizable with the alkenyl succinic anhydride; and, optionally, (iii) 0 to 75 weight percent of at least one unsaturated monomer, other than a (meth)acrylic-monomer, which is copolymerizable with the anhydride and the (meth)acrylic monomer; and (b) a compound having an average of at least two functional groups per molecule which are reactive with anhydride groups.

24 Claims, No Drawings

CURABLE COMPOSITIONS INCORPORATING ANHYDRIDE-FUNCTIONAL POLYMERS DERIVED FROM ALKENYL SUCCINIC ANHYDRIDE

BACKGROUND OF THE INVENTION

1. Field of the Invention

This invention relates to anhydride-functional polymers obtained by polymerizing, under free radical addition polymerization conditions, (i) an alkenyl succinic anhydride having the structure:

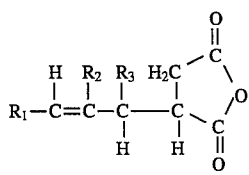

wherein $R_1$, $R_2$ and $R_3$ are each independently hydrogen or alkyl or substituted alkyl of 1 to about 30, preferably 1 to about 8 carbons; and (ii) at least one (meth)acrylic unsaturated monomer copolymerizable with the alkenyl succinic anhydride; and, optionally, (iii) at least one other copolymerizable ethylenically unsaturated monomer. The $R_1$, $R_2$ and $R_3$ groups can be alkyl groups which are substituted with other groups such as phenyl, ethoxy or any other groups which are stable during the subsequent free radical polymerization of the alkenyl succinic anhydride. The anhydride-functional polymers should have an average of at least two anhydride groups per molecule.

The anhydride-functional polymers are useful as corrosion or scale inhibitors, thickeners, dispersants and as reactive agents and/or crosslinking agents for compounds having functional groups, such as epoxy, hydroxyl or amine groups, which are reactive with anhydride groups. The anhydride polymers can, therefore, be utilized in a variety of materials such as plastics, fibers, adhesives, paper sizing, inks and, particularly, coating compositions.

This invention also relates to novel reactive compositions which utilize the anhydride-functional polymer in combination with one or more other materials which can react with anhydride groups. These reactive compositions can be reacted at room temperature or force dried at temperatures ranging up to about 350° F. or higher if desired. When utilized as reactive crosslinking agents for coatings, the anhydride-functional polymers may be utilized in a variety of coating applications, including primers and topcoats as well as clearcoats and/or basecoats in clearcoat/basecoat compositions.

The reactive compositions typically involve the combination of the anhydride-functional polymer with materials reactive with anhydrides such as polyepoxides, polyamines, polyols, etc. One preferred reactive composition comprises the anhydride-functional polymer and a polyol, preferably a hydroxy-functional polymer, optionally in combination with an epoxide or polyepoxide. Another preferred reactive composition comprises the anhydride-functional polymer, an acid-functional compound, an epoxide or polyepoxide, and, optionally, a polyol. All of these combinations can provide fast reacting, durable coatings which minimize the toxicity problems which may be associated with other low temperature curing systems.

2. Description of the Prior Art

The reaction of alkenyl succinic anhydrides and selected olefins has been known in the art. Japanese examined patent application number 48-43191 teaches the Ziegler-Natta copolymerization of alkenyl anhydrides with olefins such as ethylene, butene or styrene, in the presence of a mixed catalyst comprising an organic metal compound and a transition metal compound. Japanese patents 01225964, 46027530 and 57080408 teach copolymers incorporating alkenyl succinic anhydrides. U.S. Pat. No. 4,374,235 teaches polymers obtained by the free radical initiated addition polymerization of an alkenyl succinic anhydride with one or more vinyl monomers such as maleic anhydride, maleimides, vinyl acetate, and alkyl vinyl ethers. U.S. Pat. No. 4,599,432 teaches the production of alkenyl succinic anhydride compositions by reaction of an olefin and maleic anhydride at temperatures ranging from 170° C. to 260° C., generally in the absence of a solvent, followed by the addition of a free radical catalyst to polymerize any unreacted olefin and maleic anhydride.

Unsaturated anhydrides, such as maleic anhydride, and copolymers made from maleic anhydride are known in the art. Such anhydride copolymers are heterogeneous with respect to the distribution of anhydride groups along the backbone of the polymer due to the abnormal copolymerization behavior of maleic anhydride with other monomers, and the acid groups generated from opening these anhydrides by reaction with hydroxyl or amine groups are not highly reactive for further cure reactions, e.g. with epoxy groups, due to steric hindrance arising from the proximity of the anhydride ring to the polymer backbone. Such anhydride-functional polymers are also relatively viscous and may be difficult to utilize in combination with low levels of solvent. Additionally, such polymers may form dark colored materials when certain base catalysts, such as N-methyl imidazole, are used to accelerate a subsequent reaction of the polyanhydride with reactive materials such as hydroxy-functional compounds.

Coating compositions comprising polyanhydrides in combination with other reactive materials are known in the art. For example, U.S. Pat. No. 4,946,744 teaches clearcoat/basecoat combinations involving (i) a polyanhydride, for example, such as that prepared by copolymerization of maleic anhydride with (meth)acrylic monomers, and (ii) a polyol. U.S. Pat. No. 5,227,243 teaches curable compositions comprising a polyanhydride, a polyol and an epoxy-functional compound. U.S. Pat. No. 4,871,806 teaches curable compositions comprising a polyanhydride, a polyacid, a polyol and an epoxy-functional compound. U.S. Pat. No. 4,859,758 teaches an acid-functional cellulose ester based polymer which could be used in combination with a polyanhydride and a polyepoxide. U.S. Pat. No. 4,927,868 teaches copolymers of alpha olefins and unsaturated anhydrides which could be used with a polyepoxide and, preferably, a polyacid.

BRIEF SUMMARY OF THE INVENTION

This invention involves anhydride-functional polymers obtained by polymerizing an alkenyl succinic anhydride with at least one (meth)acrylic unsaturated monomer. If desired, at least one other copolymerizable ethylenically unsaturated monomer can also be included in the polymerization. It is surprising that high levels of the alkenyl succinic anhydride, e.g. greater than 20% by weight of the monomer mixture, can be copolymerized in such good yields with the (meth)acrylic monomers. Furthermore, the polymers produced thereby have excellent performance characteristics including excellent cure kinetics, flexibility of cured films and the capability of providing higher solid coating formulations to minimize air pollution concerns. The anhydride-functional polymers can be, if desired, fully or partially hydrolyzed to produce acid-functional polymers, or they can be directly utilized as crosslinking agents for materials having an average of at least two functional groups which are reactive with anhydride groups, such as epoxy, hydroxyl or amine functionality.

Therefore, this invention also relates to reactive or curable compositions which comprise (i) the anhydride-functional polymers of this invention; and (ii) a compound having an average of at least two functional groups per molecule which are reactive with anhydride groups. A particularly preferred curable composition comprises (i) the anhydride-functional polymer and (ii) a hydroxy-functional compound having an average of at least two hydroxyl groups per molecule, optionally in combination with an epoxide or polyepoxide. Another preferred combination comprises (i) the anhydride-functional polymer, (ii) an acid-functional compound having an average of at least two acid groups per molecule, (iii) an epoxide or polyepoxide, and, optionally, (iv) a hydroxy-functional compound having an average of at least two hydroxyl groups per molecule. Another useful composition comprises (i) the anhydride functional polymer and (ii) a polyamine compound having an average of at least two primary and/or secondary amine groups per molecule. Another useful composition comprises (i) the anhydride-functional polymer and (ii) a polyepoxide. The term "compound" is used in its broadest sense to include monomers, oligomers and polymers.

Although the curable compositions of this invention can be utilized without solvent in many applications, it is frequently preferred to utilize them in combination with about 5% to about 75% by weight, based on the total weight of the mixture of an inert solvent. It is convenient to provide the reactive composition as a multicomponent system which is reactive upon mixing the components. Especially preferred is a two-component system wherein the anhydride-functional polymer and the acid-functional compound, if utilized, are combined in one package and the epoxy-functional compound and/or the hydroxy-functional compound provide a second package. The two packages can then be mixed together to provide the curable composition immediately prior to use.

In one preferred application, this invention also relates to coated substrates having a multi-layer decorative and/or protective coating which comprises:

(a) a basecoat comprising a pigmented film-forming polymer; and (b) a transparent clearcoat comprising a film-forming polymer applied to the surface of the basecoat composition; wherein the clearcoat and/or the basecoat comprises the curable compositions of this invention. The term "film forming polymer" means any polymeric material that can form a film from evaporation of any carrier or solvent.

Accordingly, one object of this invention is to provide a novel anhydride-functional polymer. Another object is to provide improved curable compositions having excellent reactivity at low temperatures. It is a further object of this invention to provide coating compositions which may be utilized as primers, topcoats or clearcoats and/or basecoats in clearcoat/basecoat compositions. Another object of this invention is to provide an improved two-package coating composition wherein one package comprises a novel anhydride-functional polymer and, optionally, an acid-functional compound and the other package comprises an epoxy-functional compound and/or a hydroxy-functional compound. Another object of this invention is to provide coatings having excellent reactivity, durability and corrosion resistance. A further object of this invention is to provide improved coating compositions which can be cured at room temperature or force dried at elevated temperatures. It is also an object of this invention to provide curable compositions which are relatively low in viscosity and which can be utilized with reduced amounts of volatile organic solvents. These and other objects of the invention will become apparent from the following discussions.

DETAILED DESCRIPTION OF THE INVENTION

The alkenyl succinic anhydride monomers useful in this invention are well known. Alkenyl succinic anhydrides are readily prepared by the ene reaction of an alkene, or mixture of alkenes, with maleic anhydride. The ene reaction requires fairly vigorous reaction conditions and can be accomplished by mixing, typically in approximately a 2:1 molar ratio, one or more alkenes with maleic anhydride and maintaining the reaction at temperatures of about 180° C.– 210° C. at pressures around 900–1400 psi for six to twelve hours. The alkene has the general formula

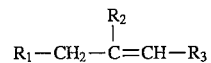

wherein $R_1$, $R_2$, $R_3$ are each independently hydrogen or alkyl or substituted alkyl of 1 to about 30, preferably 1 to about 8, carbons. For purposes of this invention, the substituted R groups should not contain chemical groups which would significantly and adversely interfere with the subsequent polymerization of the anhydride product under free radical addition polymerization conditions or which would react with the anhydride group during the preparation of the alkenyl succinic anhydride or its subsequent polymerization. Groups which are known to react with anhydride groups include epoxy, thiol, hydroxy and primary and secondary amines.

Representative alkenyl succinic anhydride monomers include allyl succinic arthydride, isobutenyl succinic anhydride, butenyl succinic anhydride, octenyl succinic anhydride, nonenyl succinic anhydride, dodecenyl succinic anhydride, tetradecenyl succinic anhydride, n-hexadecenyl succinic anhydride, iso-hexadecenyl succinic anhydride, n-octadecenyl succinic anhydride, iso-octadecenyl succinic anhydride, n-triacontenyl succinic anhydride, etc. A wide variety of alkenyl succinic anhydride are commercially available from The Humphrey Chemical Company, P.O. Box 325, North Haven, Conn. Alkenyl succinic anhydrides are routinely prepared by the reaction of maleic anhydride and olefins, optionally in the presence of solvents, diluents, antioxidants, catalysts, additives, etc. at temperatures ranging from about 170° C. to about 270° C. Representative preparations are taught in U.S. Pat. Nos. 2,411,215, 3,819, 660, 3,855,251, 3,953,475, 4,388,471, 4,599,433, 4,761,488, 4,956,478, 5,021,169 and many others.

Allyl succinic anhydride (sometimes called propenyl succinic anhydride) is especially preferred as the alkenyl succinic anhydride due to its reactivity and commercial availability. The synthesis of allyl succinic anhydride has been representatively taught by Alder, et al., *Chem. Ber.* 1983, 76, 27; and Phillips, et al., *J. Am. Chem. Soc.* 1958, 80, 3663;

and Anderson, et al., U.S. Pat. No. 3,243,480 issued Mar. 29, 1966. The synthesis taught in these references involves the ene reaction, in a bomb at 200° C. for approximately 12 hours, of maleic anhydride and propylene in the presence of a diluent such as benzene and a polymerization inhibitor such as p-t-butylcatechol. Allyl succinic anhydride is commercially available from a variety of sources, including The Humphrey Chemical Company, Polysciences, Inc. at 400 Valley Road, Warrington, Pa., and from Wacker Chemicals (USA), Inc. at 50 Locust Avenue, New Haven, Conn.

The polymerization of the alkenyl succinic anhydride with the (meth)acrylic monomers under free radical addition polymerization conditions surprisingly proceeds at excellent yield and provides polymers having excellent reactivity, flexibility and overall performance. The reactivity and flexibility are due, at least in part, to the fact that the anhydride groups are separated by several carbon atoms away from the backbone of the polymer. Additionally, the use of (meth)acrylic monomers provides superior exterior weathering performance and durability when compared to polymers incorporating only vinyl-type monomers.

1. ANHYDRIDE-FUNCTIONAL POLYMERS

The anhydride-functional polymers which are useful in the practice of this invention will have an average of at least two anhydride groups per molecule and are prepared by polymerizing a monomer mixture comprising the alkenyl succinic anhydride and at least one (meth)acrylic monomer under free radical addition polymerization conditions. Polymerizing under free radical addition polymerization conditions means that the monomers are reacted in the presence of a free radical source at a temperature sufficient for polymerization. Optionally, other copolymerizable monomers, such as vinyl compounds, can be included in the polymerization reaction. The monomers which are copolymerized with the alkenyl succinic anhydride should, of course, be free of any functionality which could react with the anhydride group during the polymerization. The anhydride-functional polymers can be conveniently prepared by free radical addition polymerization techniques, however, the effective incorporation of the alkenyl succinic anhydride monomers requires special considerations which are not typically involved in (meth)acrylic free radical polymerization. For example, it is preferred to conduct the polymerization at relatively high temperatures, normally in excess of 110° C., and preferably at temperatures ranging from 135° C. to about 170° C. Additionally, relatively higher amounts of initiator are generally preferred than the levels normally used for conventional free radical polymerization of (meth)acrylic monomers and initiator concentrations will typically be within a range of 0.2 to 15, and preferably 2 to 8 weight percent of the total monomer charge. Peroxide initiators, and especially those having a relatively long half-life, e.g. greater than about 15 minutes, at these reaction temperatures are generally preferred over the azo type initiators. Di-tertiary butyl peroxide, di-(tertiary-butyl peroxyisopropyl)benzene and, especially, di-tertiary-amyl peroxide are particularly useful initiators. Additionally, aromatic hydrocarbons are generally preferred as the inert solvent rather than oxygenated inert solvents when minimal color development during the polymerization if preferred. Exxate 600 (trade name for oxohexylacetate from Exxon Chemical Company) and xylene are representative useful solvents for the polymerization. Furthermore, monomers having acrylic, rather than methacrylic, unsaturation, or monomers having allylic hydrogen atoms, such as isobornyl methacrylate, generally provide higher degrees of incorporation of the alkenyl succinic anhydride into the polymer and it is especially preferred that the monomer mixture comprise at least one such monomer. Preferably, at least 5% by weight of the monomer mixture will be monomers having such functionality. Although it is not our intent to be bound by theory, experimental evidence indicates that under these reaction conditions, the alkenyl succinic anhydride copolymerizes as alternating and/or block copolymers and also, to at least some extent, by grafting, free radical rearrangement or other mechanism to produce quaternary carbon atoms. The acrylic monomers, or monomers having allylic hydrogen, provide a preferred site for grafting or free radical rearrangement not present in the other monomers. In order to provide the lowest possible viscosity, the anhydride-functional polymers preferably are ungelled. By "ungelled" is meant that the polymer itself is substantially free of any gel structures, insoluble fractions or internal crosslinking, and that the monomer mixture used to prepare the polymer was substantially free of any monomers having multiple polymerizable unsaturated sites.

The monomer mixture used to prepare the anhydride-functional polymer should generally comprise at least 5% by weight of the alkenyl succinic anhydride monomers and at least 5% by weight of at least one (meth)acrylic monomer. An especially preferred anhydride-functional polymer comprises the free radical addition polymerization product of a monomer mixture comprising (a) 5 to 80, and especially 20 to about 75, weight percent of the alkenyl succinic anhydride monomer; and (b) 20 to 95, and especially 25 to about 80, weight percent of at least one (meth)acrylic monomer; and, optionally, (c) 0 to 75, and especially 0 to about 55 weight percent of at least one other unsaturated monomer copolymerizable with the anhydride monomer and the (meth)acrylic monomer. One preferred polymer when unsaturated monomers other than (meth)acrylic monomers are also utilized can be obtained from a monomer mixture comprising (a) 5 to about 79, and especially 20 to about 75, weight percent alkenyl succinic anhydride; (b) 20 to about 94, and especially 20 to about 75, weight percent of at least one (meth)acrylic monomer; and (c) 1 to 75, and especially 5 to about 60, weight percent of at least one unsaturated copolymerizable monomer, other than a (meth)acrylic monomer.

As used herein, the term (meth)acrylic monomers means those monomers having the structure:

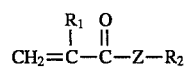

wherein $R_1$ is H or $CH_3$, Z is O or NH, and $R_2$ is H or aliphatic of 1 to about 20 carbons and could contain heteroatoms such as O or N, or Z-$R_2$ combined are —CN. Representative useful (meth)acrylic monomers include methyl acrylate, ethyl acrylate, propyl acrylate, isopropyl acrylate, butyl acrylate, isobutyl acrylate, ethyl hexyl acrylate, amyl acrylate, 3,5,5-trimethylhexyl acrylate, methyl methacrylate, ethyl methacrylate, propyl methacrylate, isobornyl methacrylate, lauryl methacrylate, butyl methacrylate, dimethylaminoethyl methacrylate, acrylic acid, methacrylic acid, acrylonitrile, methacrylonitrile, acrylamide and methacrylamide.

Monomers which are free of (meth)acrylic functionality and which could optionally be copolymerized along with the alkenyl succinic anhydride and the (meth)acrylic monomer to produce the anhydride-functional polymers of this invention include vinyl acetate, vinyl propionate, vinyl butyrate, vinyl isobutyrate, vinyl benzoate, vinyl m-chlorobenzoate, vinyl p-methoxy benzoate, vinyl chloride, styrene, alpha-methyl styrene, maleic anhydride, diethyl fumarate, dimethyl maleate, etc.

2. ACID-FUNCTIONAL COMPOUNDS

The acid-functional compounds which, optionally, can be used in combination with the anhydride-functional polymers of this invention in preparing curable compositions should have an average of at least two carboxylic acid groups per molecule. Although low molecular weight diacids and polyacids such as phthalic acid, succinic acid, adipic acid, azelaic acid, maleic acid, fumaric acid, trimellitic acid and trimesic acid can be utilized in combination with the anhydride-functional polymers in the practice of this invention, it is especially preferred to utilize polymeric acid-functional compounds.

Preferably the acid-functional polymer will have a number average molecular weight of at least about 400. Typical number average molecular weights of the carboxylic acid-functional polymers will range from about 500 to about 30,000. Representative acid-functional polymers include acrylics, polyesters and polymers prepared by the reaction of anhydrides with hydroxy-functional polymers as discussed more fully below.

2.A. Carboxylic acid-functional polymers prepared by the half-ester forming reaction of anhydrides and hydroxy-functional polymers Especially preferred as acid-functional compounds in the curable compositions of this invention are the carboxylic acid-functional polymers prepared by the half-ester opening of the cyclic anhydride by reaction with a hydroxyl group on the hydroxy-functional polymer to form one ester group and one acid group.

Typically, the hydroxy-functional polymers will have number average molecular weights of at least about 400 and typical number average molecular weights will range from about 400 to about 30,000, and especially 1,000 to about 15,000. Methods of preparing hydroxy-functional polymers are well known in the art and the method of preparation of the hydroxy-functional molecule or polymer which is reacted with the cyclic carboxylic anhydride to produce the optional acid-functional polymer is not critical to the practice of this invention. Representative polymers which can be reacted with anhydrides to produce the acid-functional polymers include the hydroxy-functional polyethers, polyesters, acrylics, polyurethanes, polycaprolactones, etc. as generally discussed in Sections 2.A. 1. through 2.A.5. below.

2.A.1. Polyether polyols are well known in the art and are conveniently prepared by the reaction of a diol or polyol with the corresponding alkylene oxide. These materials are commercially available and may be prepared by a known process such as, for example, the processes described in *Encyclopedia of Chemical Technology*, Volume 7, pages 257–262, published by Interscience Publishers, Inc., 1951; and in Kirk-Othmer *Encyclopedia of Chemical Technology*, Volume 18, pages 638–641, published by Wiley-International, 1982. Representative examples include the polypropylene ether glycols and polyethylene ether glycols such as those marketed as Niax® Polyols from Union Carbide Corporation.

2.A.2. Another useful class of hydroxy-functional polymers are those prepared by condensation polymerization reaction techniques as are well known in the art. Representative condensation polymerization reactions include polyesters prepared by the condensation of polyhydric alcohols and polycarboxylic acids or anhydrides, with or without the inclusion of drying oil, semi-drying oil, or non-drying oil fatty acids. By adjusting the stoichiometry of the alcohols and the acids while maintaining an excess of hydroxyl groups, hydroxy-functional polyesters can be readily produced to provide a wide range of desired molecular weights and performance characteristics.

The polyester polyols are derived from one or more aromatic and/or aliphatic polycarboxylic acids, the anhydrides thereof, and one or more aliphatic and/or aromatic polyols. The carboxylic acids include the saturated and unsaturated polycarboxylic acids and the derivatives thereof, such as maleic acid, fumaric acid, succinic acid, adipic acid, azelaic acid, and dicyclopentadiene dicarboxylic acid. The carboxylic acids also include the aromatic polycarboxylic acids, such as phthalic acid, isophthalic acid, terephthalic acid, etc. Anhydrides such as maleic anhydride, phthalic anhydride, trimellitic anhydride, or Nadic Methyl Anhydride (brand name for methylbicyclo[2.2.1]heptene-2,3-dicarboxylic anhydride isomers) can also be used.

Representative saturated and unsaturated polyols which can be reacted in stoichiometric excess with the carboxylic acids to produce hydroxy-functional polyesters include diols such as ethylene glycol, dipropylene glycol, 2,2,4-trimethyl 1,3-pentanediol, neopentyl glycol, 1,2-propanediol, 1,3-propanediol, 1,4-butanediol, 1,3-butanediol, 2,3-butanediol, 1,5-pentanediol, 1,6-hexanediol, 2,2-dimethyl-1,3-propanediol, 1,4-cyclohexanedimethanol, 1,2-cyclohexanedimethanol, 1,3-cyclohexanedimethanol, 1,4-bis(2-hydroxyethoxy)cyclohexane, trimethylene glycol, tetramethylene glycol, pentamethylene glycol, hexamethylene glycol, decamethylene glycol, diethylene glycol, triethylene glycol, tetraethylene glycol, norbornylene glycol, 1,4-benzenedimethanol, 1,4-benzenediethanol, 2,4-dimethyl-2-ethylenehexane- 1,3-diol, 2-butene- 1,4-diol, and polyols such as trimethylolethane, trimethylolpropane, trimethylolhexane, triethylolpropane, 1,2,4-butanetriol, glycerol, pentaerythritol, dipentaerythritol, etc.

Typically, the reaction between the polyols and the polycarboxylic acids is conducted at about 120° C. to about 200° C. in the presence of an esterification catalyst such as dibutyl tin oxide.

2.A.3. Additionally, hydroxy-functional polymers can be prepared by the ring opening reaction of epoxides and/or polyepoxides with primary or, preferably, secondary amines or polyamines to produce hydroxy-functional polymers. Representative amines and polyamines include ethanol amine, N-methylethanol amine, dimethyl amine, ethylene diamine, isophorone diamine, etc. Representative polyepoxides include those prepared by condensing a polyhydric alcohol or polyhydric phenol with an epihalohydrin, such as epichlorohydrin, usually under alkaline conditions. Some of these condensation products are available commercially under the designations EPON or DRH from Shell Chemical Company, and methods of preparation are representatively taught in U.S. Pat. Nos. 2,592,560; 2,582,985 and 2,694,694.

2.A.4. Other useful hydroxy-functional polymers can be prepared by the reaction of an excess of at least one polyol, such as those representatively described in Section 2.A.2 above, with polyisocyanates to produce hydroxy-functional urethanes. Representative polyisocyanates having two or more isocyanate groups per molecule include the aliphatic compounds such as ethylene, trimethylene, tetramethylene, pentamethylene, hexamethylene, 1,2-propylene, 1,2-butylene, 2,3-butylene, 1,3-butylene, ethylidene and butylidene diisocyanates; the cycloalkylene compounds such as 3-isocyanatomethyl- 3,5,5-trimethylcyclohexylisocyanate, and the 1,3-cyclopentane, 1,3-cyclohexane, and 1,2-cyclohexane diisocyanates; the aromatic compounds such as m-phenylene, p-phenylene, 4,4'-diphenyl, 1,5-naphthalene and 1,4-naphthalene diisocyanates; the aliphatic-aromatic compounds such as 4,4'-diphenylene methane, 2,4- or 2,6-toluene, or mixtures thereof, 4,4'-toluidine, and 1,4-xylylene diisocyanates; the nuclear substituted aromatic compounds such as dianisidine diisocyanate, 4,4'-diphenylether diisocyanate and chlorodiphenylene diisocyanate; the triisocyanates such as triphenyl methane-4,4',4"-triisocyanate, 1,3,5-triisocyanate benzene and 2,4,6-triisocyanate toluene; and the tetraisocyanates such as 4,4'-diphenyl-dimethyl methane-2, 2'- 5,5'-tetraisocyanate; the polymerized polyisocyanates such as tolylene diisocyanate dimers and trimers, and other various polyisocyanates containing biuret, urethane, and/or allophanate linkages. The polyisocyanates and the polyols are typically reacted at temperatures of 25° C. to about 150° C. to form the hydroxy-functional polymers.

2.A.5. Useful hydroxy-functional polymers can also be conveniently prepared by free radical polymerization techniques such as in the production of acrylic resins. The polymers are typically prepared by the addition polymerization of one or more monomers. At least one of the monomers will contain, or can be reacted to produce, a reactive hydroxyl group. Representative hydroxy-functional monomers include 2-hydroxyethyl acrylate, 2-hydroxyethyl methacrylate, 2-hydroxypropyl acrylate, 4-hydroxybutyl methacrylate, 2-hydroxypropyl methacrylate, 3-hydroxybutyl acrylate, 4-hydroxybutyl acrylate, 4-hydroxypentyl acrylate, 2-hydroxyethyl ethacrylate, 3-hydroxybutyl methacrylate, 2-hydroxyethyl chloroacrylate, diethylene glycol methacrylate, tetra ethylene glycol acrylate, para-vinyl benzyl alcohol, etc. Typically the hydroxy-functional monomers would be copolymerized with one or more monomers having ethylenic unsaturation such as:
(i) esters of acrylic, methacrylic, crotonic, tiglic, or other unsaturated acids such as: methyl acrylate, ethyl acrylate, propyl acrylate, isopropyl acrylate, butyl acrylate, isobutyl acrylate, ethylhexyl acrylate, amyl acrylate, 3,5,5-trimethylhexyl acrylate, methyl methacrylate, ethyl methacrylate, propyl methacrylate, dimethylaminoethyl methacrylate, isobornyl methacrylate, t-butyl methacrylate ethyl tiglate, methyl crotonate, ethyl crotonate, etc.;
(ii) vinyl compounds such as vinyl acetate, vinyl propionate, vinyl butyrate, vinyl isobutyrate, vinyl benzoate, vinyl m-chlorobenzoate, vinyl p-methoxybenzoate, vinyl alpha-chloroacetate, vinyl toluene, vinyl chloride, etc.;
(iii) styrene-based materials such as styrene, alpha-methyl styrene, alpha-ethyl styrene, alpha-bromo styrene, 2,6-dichlorostyrene, etc.;
(iv) allyl compounds such as allyl chloride, allyl acetate, allyl benzoate, allyl methacrylate, etc.;
(v) other copolymerizable unsaturated monomers such as ethylene, acrylonitrile, methacrylonitrile, dimethyl maleate, isopropenyl acetate, isopropenyl isobutyrate, acrylamide, methacrylamide, and dienes such as 1,3-butadiene, etc.
The polymers are conveniently prepared by conventional free radical addition polymerization techniques. Frequently, the polymerization will be catalyzed by conventional initiators known in the art to generate a free radical such as azobis(isobutyronitrile), cumene hydroperoxide, t-butyl perbenzoate, etc. Typically, the acrylic monomers are heated in the presence of the catalyst at temperatures ranging from about 35° C. to about 200° C., and especially 75° C. to 150° C., to effect the polymerization. The molecular weight of the polymer can be controlled, if desired, by the monomer selection, reaction temperature and time, and/or the use of chain transfer agents as is well known in the art.

Especially preferred polymers in the practice of this invention for reaction with the cyclic anhydride to produce the carboxylic acid-functional polymers are hydroxy-functional polyesters and hydroxy-functional acrylic polymers. An especially preferred hydroxy-functional polymer is the addition polymerization reaction product of (a) 5 to 100, and especially 10 to about 40, weight percent of a hydroxy-functional ethylenically unsaturated monomer and (b) 0 to 95, and especially 60 to about 90, weight percent of at least one other ethylenically unsaturated monomer copolymerizable with the hydroxy-functional monomer.

The cyclic carboxylic acid anhydrides useful in the practice of this invention to produce the carboxylic acid-functional half- ester product by reaction with the hydroxy-functional compound can be any monomeric aliphatic or aromatic cyclic anhydride having one anhydride group per molecule. Representative anhydrides include phthalic anhydride, 3-nitrophthalic anhydride, 4-nitrophthalic anhydride, 3-flourophthalic anhydride, 4-chlorophthalic anhydride, tetrachlorophthalic arthydride, tetrabromophthalic anhydride, tetrahydrophthalic anhydride, hexahydrophthalic anhydride, methylhexahydrophthalic anhydride, succinic anhydride, dodecenylsuccinic anhydride, octylsuccinic anhydride, maleic anhydride, dichloromaleic anhydride, glutaric anhydride, adipic anhydride, chlorendic anhydride, itaconic anhydride, citraconic anhydride, endo-methylenetetrahydrophthalic anhydride, cyclohexane- 1,2-dicarboxylic anhydride, 4-cyclohexene- 1,2-dicarboxylic anhydride, 4-methyl-4-cyclohexene- 1,2-dicarboxylic anhydride, 5-norbornene-2,3-dicarboxylic anhydride, 1,4-cyclohexadiene-1,2-dicarboxylic anhydride, 1,3-cyclopentanedicarboxylic anhydride, diglycolic acid anhydride, etc. Maleic anhydride is especially preferred because of its reactivity and relatively low cost. Other useful anhydrides include those anhydrides having a free carboxyl group in addition to the anhydride group such as trimellitic anhydride, aconitic anhydride, 2,6,7-naphthalene tricarboxylic anhydride, 1,2, 4-butane tricarboxylic anhydride, 1,3,4-cyclopentane tricarboxylic anhydride, etc.

The reaction of the hydroxy-functional compound and the cyclic anhydride can be conducted at temperatures ranging up to about 150° C. but should normally be conducted at temperatures less than about 75° C., preferably less than 65° C., and most preferably between about 35° C. to 60° C. The reaction temperature is maintained until the reaction has proceeded to provide the desired amount of half-ester groups on the acid-functional compound. Normally, as a convenient measure of the extent of the reaction, the reaction will be continued until no change in the amount of residual unreacted anhydride can be observed, and will generally involve reacting at least about 70%, and preferably at least 95%, of the available anhydride. If the subsequent end use of the acid-functional polymer can tolerate the remaining free anhydride, if any, no separation or removal of the excess unreacted anhydride is necessary. If the end use of the acid-functional polymer requires that it be free of any unreacted anhydride, the reaction can be continued until substantially all of the anhydride has reacted, or the free anhydride may be removed by vacuum distillation or other techniques well known in the art.

The level of anhydride reacted with the hydroxy-functional compound need only be sufficient to provide the final desired acid value of the acid functional compound. Typically the reaction would be conducted by admixing the polyol and the anhydride at levels to provide at least about 0.3 and normally about 0.7 to 1.0 anhydride groups for each hydroxyl group. By conducting the reaction at temperatures less than about 75° C. the carboxylic acid groups formed as part of the half-ester are not appreciably reactive with the hydroxyl groups themselves and so they do not compete with the ring opening half-ester reaction of the remaining anhydrides.

In order to conduct the reaction at these relatively low temperatures, it is preferred to utilize an esterification catalyst. The catalyst should be present in sufficient amount to catalyze the reaction and typically will be present at a level of at least about 0.01%, and normally from about 0.05% to about 3.0%, based upon the weight of the cyclic anhydride. Catalysts which are useful in the esterification reaction of the anhydride with the hydroxy-functional molecule include mineral acids such as hydrochloric acid and sulfuric acid; alkali metal hydroxides such as sodium hydroxide; tin compounds such as stannous octoate, or dibutyltin oxide; aliphatic or aromatic amines, especially tertiary alkyl amines, such as triethylamine; and aromatic heterocyclic amines such as N-methyl imidazole and the like. Especially preferred are N-methyl imidazole and triethylamine.

Although the reaction between the hydroxy-functional compound and the anhydride can be conducted in the absence of solvent if the materials are liquid at the reaction temperature, it is normally preferred to conduct the reaction in the presence of an inert solvent such as esters, ketones, ethers or aromatic hydrocarbons. If desired, the acid-functional molecule can be utilized as the solvent solution, or, optionally, all or part of the inert solvent may be removed, e.g. by distillation, after the reaction is completed.

After the reaction is completed, it is frequently desirable to add a low molecular weight alcohol solvent, such as isobutanol or isopropanol, to the acid-functional at a level of about 5 to 35 percent by weight to provide stabilization on storage.

2.B. Carboxylic Acid-Functional Polymers Prepared From Unsaturated Acid-Functional Monomers Useful acid-functional polymers can also be conveniently prepared by the free radical addition polymerization of unsaturated acids such as maleic acid, acrylic acid, methacrylic acid, crotonic acid, etc. along with one or more unsaturated monomers. Representative monomers include the esters of unsaturated acids, vinyl compounds, styrene-based materials, allyl compounds and other copolymerizable monomers as representatively taught in Section 2.A.5. of this specification. The monomers which are co-polymerized with the unsaturated acid should be free of any functionality which could react with the acid groups during the polymerization.

2. C. Carboxylic Acid-Functional Polymers Prepared From Polyols and Polyacids Other useful acid-functional polymers include polyester polymers obtained from the reaction of one or more aromatic and/or aliphatic carboxylic acids or their anhydrides and one or more aliphatic and/or aromatic polyols wherein the acid functionality is present in a stoichiometric excess over the hydroxy functionality. Representative carboxylic acids and polyols include those listed in Section 2.A.2. of this specification.

3. EPOXY-FUNCTIONAL COMPOUNDS

The curable coatings of this invention may also incorporate at least one epoxy-functional compound. The epoxy compounds can, if there are sufficient other reactive materials to provide crosslinking, be monoepoxies or, preferably, a polyepoxide having an average of at least two epoxy groups per molecule.

Representative useful monoepoxides include the monoglycidyl ethers of aliphatic or aromatic alcohols such as butyl glycidyl ether, octyl glycidyl ether, nonyl glycidyl ether, decyl glycidyl ether, dodecyl glycidyl ether, p-tert-butylphenyl glycidyl ether, and o-cresyl glycidyl ether. Monoepoxy esters such as the glycidyl ester of versatic acid (commercially available as CARDURA® E from Shell Chemical Company), or the glycidyl esters of other acids such as tertiary-nonanoic acid, tertiary-decanoic acid, tertiary-undecanoic acid, etc. are also useful. Similarly, if desired, unsaturated monoepoxy esters such as glycidyl acrylate, glycidyl methacrylate or glycidyl laurate could be used. Additionally, monoepoxidized oils can also be used.

Other useful monoepoxies include styrene oxide, cyclohexene oxide, 1,2-butene oxide, 2,3-butene oxide, 1,2-pentene oxide, 1,2-heptene oxide, 1,2-octene oxide, 1,2-nonene oxide, 1,2-decene oxide, and the like.

It is only necessary that the monoepoxide compounds have a sufficiently low volatility to remain in the coating composition under the applicable conditions of cure.

Polyepoxides are especially preferred in the reactive coatings of this invention. Especially preferred as the polyfunctional epoxy compounds, due to their reactivity and durability, are the polyepoxy-functional cycloaliphatic epoxies. Preferably, the cycloaliphatic epoxies will have a number average molecular weight less than about 2,000 to minimize the viscosity. The cycloaliphatic epoxies are conveniently prepared by methods well known in the art such as epoxidation of dienes or polyenes, or the epoxidation of unsaturated esters by reaction with a peracid such as peracetic and/or performic acid.

Commercial examples of representative preferred cycloaliphatic epoxies include 3,4-epoxycyclohexylmethyl 3,4-epoxycyclohexane carboxylate (e.g. "ERL-4221" from Union Carbide Corp.); bis(3,4-epoxycyclohexylmethyl)adipate (e.g. "ERL-4299" from Union Carbide Corporation); 3,4-epoxy-6-methylcyclohexylmethyl 3,4-epoxy-6-methylcyclohexane carboxylate (e.g. "ERL-4201" from Union Carbide Corp.); bis(3,4-epoxy-6-methylcyclohexylmethyl)adipate (e.g. "ERL-4289" from Union Carbide Corp.); bis(2, 3-epoxycyclopentyl) ether (e.g. "ERL-0400" from Union Carbide Corp.); dipentene dioxide (e.g. "ERL-4269" from Union Carbide Corp.); 2-(3,4-epoxycyclohexyl-5, 5-spiro-3,4-epoxy) cyclohexanemetadioxane (e.g. "ERL-4234" from Union Carbide Corp.). Other commercially available cycloaliphatic epoxies are available from Ciba-Geigy Corporation such as CY 192, a cycloaliphatic diglycidyl ester epoxy resin having an epoxy equivalent weight of about 154. The manufacture of representative cycloaliphatic epoxies is taught in various patents including U.S. Pat. Nos. 2,884,408, 3,027,357 and 3,247,144.

Other polyepoxides potentially useful in the practices of this invention include aliphatic and aromatic polyepoxies, such as those prepared by the reaction of an aliphatic polyol or polyhydric phenol and an epihalohydrin. Other useful epoxies include epoxidized oils and free radical addition polymers derived from ethylenically unsaturated epoxy-functional monomers such as glycidyl acrylate or glycidyl methacrylate in combination with other copolymerizable monomers such as those listed in 2.A.5 above.

4. HYDROXY-FUNCTIONAL COMPOUNDS

The hydroxy-functional compounds which are useful in combination with the anhydride-functional polymers to prepare curable compositions in the practice of this invention should have an average of at least two hydroxyl groups per molecule. Although low molecular weight diols and polyols such as propylene glycol, 1,6 hexanediol, triethanol amine and pentaerythritol can be utilized in the practice of this invention, it is especially preferred to utilize polymeric hydroxy-functional compounds such as polyethers, polyesters, acrylics, polyurethanes, polycaprolactones, etc.

Preferably the hydroxy-functional polymer will have a number average molecular weight of at least about 400. Typical number average molecular weights will range from about 400 to about 30,000, and especially 1,000 to about 15,000. In order to provide the fastest rate of reaction during cure it is preferred in the practice of this invention to utilize hydroxy-functional compounds having predominantly, and preferably all, primary hydroxy functionality.

Representative hydroxy-functional polymers are taught in Sections 2. A. 1. through 2. A. 5. Especially preferred as the hydroxy-functional polymer is a hydroxy-functional polymer comprising the addition polymerization reaction product of (a) 10 to about 60 weight percent of a hydroxy-functional ethylenically unsaturated monomer and (b) 40 to about 90 weight percent of at least one ethylenically unsaturated monomer copolymerizable with the hydroxy-functional monomer.

5. AMINE-FUNCTIONAL COMPOUNDS

Amine-functional compounds which are useful in combination with the anhydride-functional polymers to prepare curable compositions in the practice of this invention should have an average of at least two primary or secondary amine groups per molecule. Polyamines can be prepared by methods well known in the art such as by the free radical polymerization of acrylic or other unsaturated monomers having primary or secondary amine functionality, or by the reaction of amines having at least two amine groups per molecule with a polycarboxylic acid to form polyamide amines, or by the reaction of primary amines with epoxy materials to produce secondary amine and hydroxyl functionality. The polyamines can be polymeric, typically having a number average molecular weight over 400, or lower molecular materials, such as piperazine, tetraethylenepentamine, 1,2-diaminopropane, 1,6-diaminohexane, etc. Also useful are the materials having a primary or secondary amine group and a hydroxyl group such as isopropanol amine, isobutanol amine, ethanol amine, etc.

The ratios of anhydride to other functional groups in the curable compositions can be widely varied within the practice of this invention as long as at least some of each group is present in the reactive composition. It is only necessary to combine the anhydride function polymer and other reactive materials in amounts to provide the desired degree of crosslinking upon cure. When the anhydride-functional polymer is used as one component and either a polyol or polyamine or polyepoxide is used as the only other reactive component in the curable composition, it is preferred to provide about 0.3 to about 10 hydroxyl or amine or epoxy groups for each anhydride group, and especially 1 to about 5 hydroxyl or amine or epoxy groups for each anhydride group. When the curable composition involves a combination of only the anhydride-functional polymer, an epoxide or polyepoxide, and a polyol it is preferred to provide 0.3 to about 6.0 hydroxyl groups, and about 0.3 to about 6.0 epoxy groups for each anhydride group, and especially to provide about 0.5 to 1.5 hydroxyl groups and 0.25 to 0.75 epoxy groups for each anhydride group. When the curable composition involves the anhydride-functional polymer, an acid-functional compound and a polyepoxide, it is preferred to provide 0.3 to 6.0 acid groups and 0.6 to 12.0 epoxy groups for each anhydride group, and especially 2.0 to about 5.0 acid groups and 3.0 to about 8.0 epoxide groups for each anhydride group. If the reactive curable composition comprises the anhydride-functional polymer, an acid-functional compound, an epoxide or polyepoxide, and a hydroxy-functional compound, it is preferred to provide from 0.05 to about 3.0 acid groups and about 0.5 to about 4.0 epoxy groups and about 0.05 to 6.0 hydroxyl groups for each anhydride group in the reactive system. It is especially preferred to provide 1.0 to about 2.0 acid groups and 1.0 to about 3.0 epoxy groups and about 1.0 to about 4.0 hydroxyl groups for each anhydride group.

The curable compositions of this invention can be cured at temperatures ranging from about room temperature up to about 350° F. When the curable compositions are utilized as coatings, the coatings can be clear coatings or they may contain pigments as is well known in the art. Representative opacifying pigments include white pigments such as titanium dioxide, zinc oxide, antimony oxide, etc. and organic or inorganic chromatic pigments such as iron oxide, carbon black, phthalocyanine blue, etc. The coatings may also contain extender pigments such as calcium carbonate, clay, silica, talc, etc.

The coatings may also contain other additives such as flow agents, catalysts, diluents, solvents, ultraviolet light absorbers, etc.

It is especially preferred in the curable compositions of this invention to include a catalyst for the reaction of anhydride groups and hydroxyl groups and/or a catalyst for the reaction of epoxy and acid groups if present in the curable compositions. It is especially preferred in the practice of this invention to utilize tertiary amines and especially N-methylimidazole as a catalyst for the anhydride/hydroxyl reaction. The catalyst for the anhydride/hydroxyl reaction will typically be present at a level of at least 0.01% by weight of the anhydride compound and preferably 1.0 to about 5.0%.

Tertiary amines, secondary amines such as ethyl imidazole, quaternary ammonium salts, nucleophilic catalysts, such as lithium iodide, phosphonium salts, and phosphines such as triphenyl phosphine are especially useful as catalysts for epoxy/acid reactions. The catalyst for the epoxy/acid reaction will typically be present at a level of at least 0.01% by weight of the total acid-functional compound and epoxy-functional compound and will preferably be present at 0.1 to about 3.0%.

Since the curable compositions of this invention are typically provided as multi-package systems which must be mixed together prior to use, the pigments, catalysts and other additives can be conveniently added to any or all of the appropriate individual packages.

The curable compositions of this invention may typically be applied to any substrate such as metal, plastic, wood, glass, synthetic fibers, etc. by brushing, dipping, roll coating, flow coating, spraying or other method conventionally employed in the coating industry.

One preferred application of the curable coatings of this invention relates to their use as clearcoats and/or basecoats in clearcoat/basecoat formulations.

Clearcoat/basecoat systems are well known, especially in the automobile industry where it is especially useful to apply a pigmented basecoat, which may contain metallic pigments, to a substrate followed by the application of a clearcoat which will not mix with or have any appreciable solvent attack upon the previously applied basecoat. Typically, at least some of the solvent will be allowed to evaporate from the basecoat prior to the application of the clearcoat. In some applications the basecoat may even be allowed to cure, at least partially, prior to application of the clearcoat. The basecoat composition may be any of the polymers known to be useful in coating compositions including the reactive compositions of this invention.

One useful polymer basecoat includes the acrylic addition polymers, particularly polymers or copolymers of one or more alkyl esters of acrylic acid or methacrylic acid, optionally together with one or more other ethylenically unsaturated monomers. These polymers may be of either the thermoplastic type or the thermosetting, crosslinking type which contain hydroxyl or amine or other reactive functionality which can be crosslinked. Suitable acrylic esters for either type of polymer include methyl methacrylate, ethyl methacrylate, propyl methacrylate, butyl methacrylate, ethyl acrylate, butyl acrylate, vinyl acetate, acrylonitrile, acrylamide, etc. Where the polymers are required to be of the crosslinking type, suitable functional monomers which can be used in addition to those already mentioned include acrylic or methacrylic acid, hydroxy ethyl acrylate, 2-hydroxy propyl methacrylate, glycidyl acrylate, tertiary-butyl amino ethyl methacrylate, etc. The basecoat composition may, in such a case, also contain a crosslinking agent such as a carbodiimide, a polyanhydride, a polyisocyanate a polyepoxide, or a nitrogen resin such as a condensate of an aldehyde such as formaldehyde with a nitrogenous compound such as urea, melamine or benzoguanamine or a lower alkyl ether of such a condensate. Other polymers useful in the basecoat composition include vinyl copolymers such as copolymers of vinyl esters of inorganic or organic acids, such as vinyl chloride, vinyl acetate, vinyl propionate, etc., which copolymers may optionally be partially hydrolyzed so as to introduce vinyl alcohol units.

Other polymers useful in the manufacture of the basecoat include alkyd resins or polyesters which can be prepared in a known manner by the condensation of polyhydric alcohols and poly carboxylic acids, with or without the inclusion of natural drying oil fatty acids as described elsewhere in this specification. The polyesters or alkyds may contain a proportion of free hydroxyl and/or carboxyl groups which are available for reaction, if desired with suitable crosslinking agents as discussed above.

If desired, the basecoat composition may also contain waxes, rheology modifiers, cellulose esters, or other additives to alter the drying or viscosity characteristics of the basecoat.

Typically, the basecoat will include pigments conventionally used for coating compositions and after being applied to a substrate, which may or may not previously have been primed, the basecoat will normally be allowed sufficient time to form a wet polymer film which will not be lifted during the application of the clearcoat. The clearcoat is then applied to the surface of the basecoat, and the system can be allowed to dry or, if desired, can be force dried by baking the coated substrate at temperatures typically ranging up to about 250° F.

Typically, the clearcoat may contain ultraviolet light absorbers or stabilizers, such as hindered phenols or hindered amines at a level ranging up to about 6% by weight of the vehicle solids as is well known in the art. The clearcoat can be applied by any application method known in the art, but preferably will be spray applied. If desired, multiple layers of basecoat and/or clearcoat can be applied. Typically, both the basecoat and the clearcoat will each be applied to give a dry film thickness of about 0.01 to about 6.0, and especially about 0.5 to about 3.0 mils.

The following examples have been selected to illustrate specific embodiments and practices of advantage to a more complete understanding of the invention. Unless otherwise stated, "parts" means parts-by-weight, "percent" is percent-by-weight, and "equivalent weight" is on a weight solids basis.

EXAMPLE 1

A reaction vessel fitted with a mechanical stirrer, a dropping funnel, condenser and a temperature controller was charged with 54 parts xylene and 45 parts allyl succinic anhydride under a nitrogen blanket and heated to 135° C. A monomer mixture of 15 parts butyl acrylate, 25 parts methyl methacrylate, 15 parts isobornyl methacrylate, and 5 parts di-tertiary-butyl peroxide was added to the reaction mixture over a 3 hour period. After the addition of all of the monomers, the reaction mixture was maintained at 135° C. for 1 hour and 20 minutes and an additional 1 part di-t-butyl peroxide was added and the reaction mixture maintained at that temperature for 1 hour and 15 minutes, at which point an additional 1 part of di-t-butyl peroxide was added to the reaction mixture and maintained at that temperature for 1 hour 10 minutes. An additional 1 part di-t-butyl peroxide was then added and the reaction mixture was maintained at 135 ° C. for an additional 2 hours. An additional 1 part di-t-butyl peroxide was then added and the reaction mixture was maintained at 135° C. for 4-½ hours. The reaction mixture was then allowed to cool to produce a polymer at 72.6 percent NVM in xylene having an anhydride equivalent weight of 311, a number average molecular weight of 1,400, a polydispersity (Pd) of 2.4 and approximately 1.8 percent residual unreacted allyl succinic anhydride.

EXAMPLE 2

In like manner to Example 1, a polymer was prepared from a monomer mixture comprising 45 parts allyl succinic anhydride, 15 parts butyl acrylate and 40 parts trimethylcyclohexyl acrylate to produce a polymer at 68.0 percent NVM in xylene having an anhydride equivalent weight of 311, a number average molecular weight of 1,800, a Pd of 1.8, and 1.4 percent residual unreacted allyl succinic anhydride.

EXAMPLE 3

In like manner to Example 1, a polymer was prepared from a monomer mixture comprising 35 parts allyl succinic anhydride, 20 parts butyl acrylate, 40 parts methyl methacrylate, and 5 parts maleic anhydride to yield a 68.3 percent NVM polymer in xylene having an anhydride equivalent weight of 350, a number average molecular weight of 1,800, a Pd of 2.9 and approximately 1.6 percent residual unreacted allyl succinic anhydride.

EXAMPLE 4

In like manner to Example 1, a polymer was prepared from a monomer mixture of 35 parts allyl succinic anhydride, 15 parts butyl acrylate, 35 parts methyl methacrylate, and 15 parts isobornyl methacrylate to yield a polymer having an NVM of 67.4% in xylene, an anhydride equivalent weight of 400, and a residual unreacted allyl succinic anhydride level of 1.9 percent.

EXAMPLE 5

In like manner to Example 1 except that the reaction solvent was methyl amyl ketone rather than xylene, a polymer was prepared from a monomer mixture of 45 parts allyl succinic anhydride and 55 parts butyl acrylate to yield a polymer at 50% NVM in methyl amyl ketone. The polymer had an anhydride equivalent weight of 311, a number average molecular weight of 1,800 and a Pd of 2.5.

EXAMPLE 6

In like manner to Example 5, a polymer was prepared from a monomer mixture of 25 parts allyl succinic anhydride, 28 parts butyl acrylate, 32 parts methyl methacrylate, and 15 parts styrene to yield a polymer having an NVM of 59.5% in methyl amyl ketone. The polymer had an equivalent weight of 560, a number average molecular weight of 4,400 and a Pd of 4.3.

EXAMPLE 7

A reaction vessel equipped as described in Example 1 was charged with 74.1 parts of butenyl succinic anhydride and 85.0 parts Exxate-600 (oxo-hexyl acetate, Exxon Chemical Company) and heated to 160 ° C. A mixture of 87.1 parts butyl acrylate and 6.45 parts di-t-butyl peroxide was added to the heated reaction mixture over a 3 hour period. The addition and entire reaction were performed under a nitrogen atmosphere. The solution was held at 160° C. for 1 hour at which point 1.5 parts of di-t-butyl peroxide was added. The reaction was maintained at 160° C. for 30 minutes and an additional 1.5 parts of di-t-butyl peroxide was added. The reaction mixture was held at 160°–165° C. for an additional ½ hour and then allowed to cool to yield a polymer having a weight per gallon of 8.58 lb/gallon at 61 percent NVM. The polymer had a number average molecular weight of 1500 and a Pd of 1.5.

EXAMPLE 8

A reaction vessel equipped as described in Example 1 was charged with 54 parts Exxate- 600 and 45 parts allyl succinic anhydride under a nitrogen blanket and heated to 160° C. A mixture of 55 parts butyl acrylate and 5 parts di-t-amyl peroxide was added to the reaction mixture over a 3 hour period. The reaction mixture was maintained at 160° C. for one hour after completion of the addition of the monomer and an additional 0.5 parts of diot-amyl peroxide was added to the reaction mixture and maintained at that temperature for an additional hour. An additional 0.5 parts of di-toamyl peroxide was then added to the reaction mixture and maintained at that temperature for an additional hour. A final 0.5 parts of di-t-amyl peroxide was then added to the reaction mixture and the reaction mixture was maintained at the reaction temperature for an additional one hour at which point it was allowed to cool to provide an anhydride-functional polymer at 65.4% NVM in Exxate-600. The polymer had an equivalent weight of 311, a number average molecular weight of 1,800, a Pd of 1.6 and only 0.2% unreacted allyl succinic anhydride.

EXAMPLE 9

A reaction vessel equipped as described in Example 1 was charged with 175.0 parts xylene and 146.25 parts allyl succinic anhydride and heated to 140° C. A mixture of 178.75 parts butyl acrylate and 16.25 parts di-t-amyl peroxide were added to the heated reaction mixture over a 3 hour period. The reaction was maintained at 140° C. for 30 minutes at which point an additional 1.625 parts di-t-amyl peroxide was added. One hour after the previous addition of di-t-amyl peroxide, an additional 1.625 parts of di-t-amyl peroxide was added to the reaction mixture and the reaction maintained at 140° C. for one hour. The reaction mixture was then allowed to cool to provide a polymer having an excellent clear color and a weight per gallon of 8.70 at 66.7% NVM in xylene.

EXAMPLE 10

A reaction vessel equipped as described in Example 1 was charged with 215.0 parts xylene and 140.0 parts allyl succinic anhydride and heated to 140° C. A mixture of 220.0 parts butyl acrylate and 40.0 parts isobornyl methacrylate and 20.0 parts di-t-amyl peroxide were added to the heated reaction mixture over a 3 hour period. The reaction was maintained at 140° C. for 1 hour at which point an additional 4.0 parts di-t-amyl peroxide were added. Two additional charges of 4.0 parts di-t-amyl peroxide were made at i hour intervals over the next 2 hour period. The reaction mixture was then held at 140° C. for one hour and then allowed to cool to yield a polymer having an excellent clear color, a number average molecular weight of 1900, a Pd of 1.6 and less than 1.0% unreacted allyl succinic anhydride.

EXAMPLE 11

A reaction vessel equipped as described in Example 1 was charged with 215.0 parts xylene and 140.0 parts allyl succinic anhydride and heated to 140° C. A mixture of 220.0 parts butyl acrylate and 40.0 parts tobutyl acrylate and 20.0 parts di-t-amyl peroxide were added to the heated reaction mixture over a 3 hour period. The reaction was maintained at 140° C. for 1 hour at which point an additional 4.0 parts di-t-amyl peroxide was added. At 1 hour and at 2 hours after the previous addition of the di-t-amyl peroxide, an additional 4.0 parts of di-t-amyl peroxide was added each time to the reaction mixture, and the reaction mixture was maintained at 140° C. for 1 hour after the final addition of peroxide at which point it was allowed to cool to yield a polymer having an excellent clear color, a number average molecular weight of 1750, a Pd of 1.5 and less than 1% unreacted allyl succinic anhydride. The polymer solution was 67.2% NVM in xylene.

EXAMPLE 12

In like manner to Example 11, an anhydride-functional polymer at 75.2% NVM in xylene was prepared from 140.0 parts allyl succinic anhydride, 280.0 parts butyl acrylate and 80.0 parts isobornyl methacrylate. The polymer had less than 1% unreacted allyl succinic anhydride.

EXAMPLE 13

In like manner to Example 11, an anhydride-functional polymer at 66.4% NVM in xylene was prepared from 140.0 parts allyl succinic anhydride, 180.0 parts butyl acrylate and 80.0 parts t-butyl acrylate.

EXAMPLE 14

In like manner to Example 11, an anhydride-functional polymer at 64.8% NVM in xylene was prepared from 140.0 parts allyl succinic anhydride, 220.0 parts butyl acrylate and 40.0 parts methyl methacrylate to yield a clear polymer having a number average molecular weight of 1700 and a Pd of 1.7.

EXAMPLE 15

In like manner to Example 11, an anhydride-functional polymer as a 76.2% NVM solution in xylene having a number average molecular weight of 1764 and a Pd of 1.7 was prepared by the reaction of 140.0 parts allyl succinic anhydride, 180.0 parts butyl acrylate and 80.0 parts methyl methacrylate.

Representative examples of curable compositions are presented in Examples A through C.

EXAMPLE A

Preparation of Pigmented Primer-Surfacer

A curable, two-package, pigmented coating having a ratio of anhydride groups/hydroxyl groups of $1/1.5$ and catalyzed at 2.5 percent N-methylimidazole (based on polyanhydride solids) was prepared as follows:

| Raw Materials | Parts By Weight |
|---|---|
| Package One | |
| Anhydride-functional polymer of Example 1 | 206.30 |
| Package Two | |
| Hydroxy-functional acrylic resin[1] | 406.81 |
| Pigments[2] | 384.52 |
| Additives[3] | 28.00 |
| Solvents[4] | 570.94 |

[1] A 50% solid by weight acrylic polymer in toluene obtained from a monomer mixture of methyl methacrylate/butyl methacrylate/isobornyl methacrylate/hydroxy ethyl methacrylate at a weight ratio of 21.1/19.4/32.1/27.4.
[2] Clays, titanium dioxide, silicas, talcs and barytes.
[3] Waxes and silicones.
[4] Methyl isobutyl ketone/butyl acrylate/butoxypropanol/lacquer diluent/xylene/toluene/mineral spirits at a weight ratio of 15.8/26.5/14.7/8.3/21.0/12.8/0.9.

[1] A 50% solid by weight acrylic polymer in toluene obtained from a monomer mixture of methyl methacrylate/butyl methacrylate/isobornyl methacrylate/hydroxy ethyl methacrylate at a weight ratio of 21.1/19.4/32.1/27.4.
[2] Clays, titanium dioxide, silicas, talcs and barytes.
[3] Waxes and silicones.
[4] Methyl isobutyl ketone/butyl acrylate/butoxypropanol/lacquer diluent/xylene/toluene/mineral spirits at a weight ratio of 15.8/26.5/14.7/8.3/21.0/12.8/0.9.

After addition of the N-methylimidazole, the coating was spray applied over Q-steel panels and allowed to cure at room temperature to yield a primer-surfacer which after two hours of curing, was dry-to-sand and had a Konig Pendulum Hardness (KPH) of 24 as well as excellent sandability and good resistance to methyl ethyl ketone.

EXAMPLE B

Preparation of Pigmented Basecoat

A curable, two-package, pigmented coating suitable as a basecoat, having a ratio of anhydride groups/hydroxyl groups/epoxy groups of 1.6/1.9/2.0 was prepared. The anhydride-functional resins described in Examples 5 and 6 were mixed in a 2:1 weight solids ratio and combined with a hydroxy-functional acrylic polymer and cycloaliphatic epoxy ERL 4299 (trademark of Union Carbide for bis(3,4-epoxycyclohexylmethyl) adipate). The basecoat formulation incorporated a metallic pigment and when spray applied over a steel substrate and allowed to dry the basecoat gave good metal brightness and metal fix upon clearcoating and gave acceptable cure and flexibility.

EXAMPLE C

Preparation of Clearcoat

A clearcoat was prepared from the anhydride-functional polymer of Example 7, a hydroxy-functional acrylic polymer (obtained from a monomer mixture of hydroxy ethyl methacrylate/hydroxy ethyl acrylate/styrene/methyl methacrylate/butyl methacrylate/butyl acrylate/2-ethyl-hexyl acrylate of 15/21.4/18.8/18.8/17.2/ 8.0/0.8) and an epoxy resin ERL-4299 an amount to provide an equivalent ratio of anhydride to hydroxyl to epoxy groups of 1.0/1.0/0.5. The clearcoating composition was catalyzed with N-methylimidazole at 3 weight percent based upon anhydride resin weight. The clearcoating was applied over a Q-steel panel coated with a commercial primer and a commercial basecoat and allowed to dry. The clearcoating showed excellent gloss, good hardness and good resistance to methyl ethyl ketone.

While this invention has been described by a specific number of embodiments, other variations and modifications may be made without departing from the spirit and scope of the invention as set forth in the appended claims.

The entire disclosures of all applications, patents and publications cited herein are hereby incorporated by reference.

The invention claimed is:

1. A curable composition which comprises:
   (a) an anhydride-functional polymer obtained by polymerizing under free radical addition polymerization conditions, a monomer mixture comprising:
      (i) 20 to 75 weight percent of an alkenyl succinic anhydride having the structure:

$$R_1-\underset{\underset{H}{|}}{\overset{\overset{H}{|}}{C}}=\underset{}{\overset{\overset{R_2}{|}}{C}}-\underset{\underset{H}{|}}{\overset{\overset{R_3}{|}}{C}}-\underset{\underset{H}{|}}{\overset{\overset{H_2C}{|}}{C}}\diagup\overset{O}{\underset{\underset{O}{\|}}{\overset{\|}{C}}}\diagdown O$$

wherein $R_1$, $R_2$ and $R_3$ are each independently hydrogen or alkyl or substituted alkyl of 1 to about 30 carbons; and
      (ii) 25 to 80 weight percent of at least one (meth)acrylic monomer copolymerizable with the alkenyl succinic anhydride; and, optionally,
      (iii) 0 to 75 weight percent of at least one unsaturated monomer, other than a (meth)acrylic monomer, which is copolymerizable with the anhydride and the (meth)acrylic monomer; and
   (b) a compound having an average of at least two functional groups per molecule which are reactive with anhydride groups.

2. The curable composition of claim 1 wherein the monomer mixture also comprises at least one copolymerizable unsaturated monomer other than a (meth)acrylic monomer.

3. The curable composition of claim 1 wherein the monomer mixture comprises an acrylic monomer.

4. The curable composition of claim 1 wherein the monomer mixture comprises a monomer having allylic hydrogen atoms.

5. The curable composition of claim 1 wherein the alkenyl succinic anhydride is allyl succinic anhydride.

6. The curable composition of claim 1 wherein the alkenyl succinic anhydride is butenyl succinic anhydride.

7. The curable composition of claim 1 wherein the monomer mixture comprises:

(i) 5 to about 79 weight percent alkenyl succinic anhydride;
(ii) 20 to about 94 weight percent of at least one (meth)acrylic monomer; and
(iii) 1 to about 75 weight percent of at least one unsaturated copolymerizable monomer other than a (meth)acrylic monomer.

8. The curable composition of claim 1 wherein the compound having an average of at least two functional groups per molecule reactive with anhydride is a hydroxy-functional compound.

9. The curable composition of claim 8 wherein the anhydride-functional polymer and the hydroxy-functional compound are each present at a level to provide 0.3 to about 10 hydroxyl groups for each anhydride group.

10. The curable composition of claim 8 wherein the hydroxy-functional compound is a hydroxy-functional polymer.

11. The curable composition of claim 10 wherein the hydroxy-functional polymer comprises the addition polymerization reaction product of:
(a) 10 to about 60 weight percent of a hydroxy-functional ethylenically unsaturated monomer; and
(b) 40 to about 90 weight percent of at least one ethylenically unsaturated monomer copolymerizable with the hydroxy-functional monomer.

12. The curable composition of claim 8 wherein the composition also comprises a catalyst for reaction of hydroxy groups and anhydride groups.

13. The curable composition of claim 8 wherein the composition also comprises an epoxy-functional compound having an average of at least one epoxy group per molecule.

14. The curable composition of claim 13 wherein the anhydride-functional polymer, the hydroxy-functional compound, and the epoxy-functional compound are each present at a level to provide 0.3 to about 6.0 hydroxyl groups, and about 0.3 to about 6.0 epoxy groups for each anhydride group.

15. The curable composition of claim 13 wherein the epoxy-functional compound is a monoepoxide.

16. The curable composition of claim 13 wherein the epoxy-functional compound is a polyepoxide having an average of at least two epoxy groups per molecule.

17. The curable composition of claim 16 wherein the polyepoxide is a cycloaliphatic polyepoxide.

18. The curable composition of claim 16 wherein the polyepoxide is a polymer obtained by the polymerization of an ethylenically unsaturated epoxy-functional monomer and at least one other copolymerizable ethylenically unsaturated monomer.

19. The curable composition of claim 13 wherein the composition also comprises an acid-functional compound having an average of at least two carboxylic acid groups per molecule.

20. The curable composition of claim 19 wherein the composition also comprises a catalyst for the reaction of hydroxy groups and anhydride groups and a catalyst for the reaction of epoxy groups and acid groups.

21. The curable composition of claim 19 wherein the acid-functional compound is an acid-functional polymer.

22. The curable composition of claim 21 wherein the acid-functional polymer is prepared by the half-ester opening of a cyclic anhydride by reaction with a hydroxy-functional polymer.

23. The curable composition of claim 22 wherein the hydroxy-functional polymer is the addition polymerization reaction product of:
(a) 5 to 100 weight percent of a hydroxy-functional ethylenically unsaturated monomer; and
(b) 0 to 95 weight percent of at least one other ethylenically unsaturated monomer copolymerizable with the hydroxy-functional monomer.

24. The curable composition of claim 19 wherein the anhydride-functional polymer, the hydroxy-functional compound, the acid-functional compound and the epoxy-functional compound are each present at a level to provide 0.05 to about 3.0 acid groups and about 0.5 to about 4.0 epoxy groups and about 0.05 to about 6.0 hydroxyl groups for each anhydride group.

* * * * *